(12) United States Patent
Voropaeva et al.

(10) Patent No.: US 12,267,701 B1
(45) Date of Patent: Apr. 1, 2025

(54) METHOD AND SYSTEM FOR AUTOMATICALLY DETECTING CROSS-CONNECTED CELLS IN COMMUNICATION NETWORK

(71) Applicant: Elisa Oyj, Helsinki (FI)

(72) Inventors: Anastasiia Voropaeva, Helsinki (FI); Heikki Lehikoinen, Helsinki (FI)

(73) Assignee: Elisa Oyj, Helsinki (FI)

( * ) Notice: Subject to any disclaimer, the term of this patent is extended or adjusted under 35 U.S.C. 154(b) by 0 days.

(21) Appl. No.: 18/845,675

(22) PCT Filed: Mar. 15, 2023

(86) PCT No.: PCT/FI2023/050143
§ 371 (c)(1),
(2) Date: Sep. 10, 2024

(87) PCT Pub. No.: WO2023/187253
PCT Pub. Date: Oct. 5, 2023

(30) Foreign Application Priority Data

Apr. 1, 2022 (FI) .................................... 20225282

(51) Int. Cl.
*H04W 24/00* (2009.01)
*H04W 16/18* (2009.01)
*H04W 24/02* (2009.01)

(52) U.S. Cl.
CPC ........... *H04W 24/02* (2013.01); *H04W 16/18* (2013.01)

(58) Field of Classification Search
CPC .............................. H04W 24/02; H04W 16/18
See application file for complete search history.

(56) References Cited

U.S. PATENT DOCUMENTS

| 8,983,470 B1 * | 3/2015 | Ryan | H04W 24/02 |
|---|---|---|---|
| | | | 455/437 |
| 10,271,252 B2 * | 4/2019 | Jung | H04W 48/08 |

(Continued)

FOREIGN PATENT DOCUMENTS

| CN | 102075953 A | 5/2011 |
|---|---|---|
| CN | 106941685 B | 7/2017 |

(Continued)

OTHER PUBLICATIONS

European Patent Office, Notification of Transmittal of The International Search Report and the Written Opinion of the International Searching Authority, or the Declaration, Application No. PCT/FI2023/050143, mailed Jun. 7, 2023, 13 pages.

(Continued)

*Primary Examiner* — Erika A Washington
(74) *Attorney, Agent, or Firm* — Ziegler IP Law Group LLC.

(57) ABSTRACT

A computer-implemented method for automatically detecting cross-connected cells in communication network. The method includes obtaining first cell data of source cell within communication network; determining effective area of source cell using first cell data; classifying each neighbouring cell of source cell into one of: a first group, a second group, based on location of neighbouring cell; calculating share of handover events from source cell to neighbouring cells in first group using first cell data; and when share of handover events from source cell to neighbouring cells in first group lies below first threshold, filtering out neighbouring cell(s) from amongst second group with which handover events of source cell lies above second threshold and determining source cell to be cross-connected cell when: direction of filtered cell(s) is opposite to direction of the source (Continued)

cell; and/or effective area of filtered cell(s) does not overlap with effective area of source cell.

12 Claims, 7 Drawing Sheets

(56) References Cited

U.S. PATENT DOCUMENTS

| | | | |
|---|---|---|---|
| 2013/0115939 A1 | | 5/2013 | Guo et al. |
| 2015/0208300 A1* | | 7/2015 | McLaughlin ... H04W 36/00835 455/436 |
| 2018/0115913 A1 | | 4/2018 | Menon et al. |

FOREIGN PATENT DOCUMENTS

| CN | 109246724 A | 1/2019 |
|---|---|---|
| FI | 130817 B1 | 4/2024 |

OTHER PUBLICATIONS

Finnish Patent and Registration Office, Communication of Acceptance, Application No. 20225282, Dated Feb. 14, 2024, 7 pages.
Finnish Patent and Registration Office, Decision to Grant, Application No. 20225282, Dated Apr. 4, 2024, 2 pages.
Finnish Patent and Registration Office, Office Action, Application No. 20225282, mailed Oct. 31, 2022, 7 pages.
Finnish Patent and Registration Office, Search Report, Application No. 20225282, Dated Oct. 31, 2022, 2 pages.
Kaddoura et al. "Swapped Sectors Detection on Multi-Layer Networks" IEEE Communications Letters, vol. 22, No. 11, Nov. 2018, 4 pages.

* cited by examiner

METHOD AND SYSTEM FOR AUTOMATICALLY DETECTING CROSS-CONNECTED CELLS IN COMMUNICATION NETWORK

TECHNICAL FIELD

The present disclosure relates to computer-implemented methods for automatically detecting cross-connected cells in a communication network. The present disclosure also relates to systems for automatically detecting cross-connected cells in a communication network. The present disclosure also relates to computer program products for automatically detecting cross-connected cells in a communication network.

BACKGROUND

Usage of cellular communication network has increased rapidly to an extent that majority of global population has continuous access to it. Resultantly, the cellular communication network is quite complex. Typically, the cellular communication network uses radio signals for transmission of voice, data and other types of content. The cellular communication network is at least dependent on a land area which is to be supplied with the radio signals with the help of an antenna, wherein the land area is divided into a plurality of cells depending on terrain and reception characteristics. The plurality of cells are assigned with different frequencies to increase capacity in the cellular communication network.

The cellular communication network is complex and faces issues such as cross-connection of the plurality of cells. Herein, cables used in the antenna for transmitting and/or receiving the radio signals are installed and may be connected in a wrongful manner. Therefore, an unexpected behaviour is observed in the cellular communication network, causing a drop in quality of user experience. Typically, the plurality of cells whose numbers are in thousands, are manually checked by extensive drive tests and/or on-site checking. However, this can be quite expensive, long and tedious process.

The cross-connection of the plurality of cells require the extensive drive tests as the cross-connection of the plurality of cells are not detected by the Operations Support System (OSS), or by a manual inspection of a handover matrix of the plurality of cells against neighbour lists for each cell. The cross-connection leads to a greater degree of interference, poor uplink signal levels and poor performance of handover, in the plurality of cells.

Therefore, in light of the foregoing discussion, there exists a need to overcome the aforementioned drawbacks to make the cellular communication network efficient.

SUMMARY

The present disclosure seeks to provide a computer-implemented method for automatically detecting cross-connected cells in a communication network. The present disclosure also seeks to provide a system for automatically detecting cross-connected cells in a communication network. The present disclosure also seeks to provide a computer program product for automatically detecting cross-connected cells in a communication network. An aim of the present disclosure is to provide a solution that overcomes at least partially the problems encountered in prior art.

In a first aspect, the embodiment of the present disclosure provides a computer-implemented method for automatically detecting cross-connected cells in a communication network, the method comprising:
  obtaining a first cell data of a source cell within the communication network;
  determining an effective area of the source cell using the first cell data;
  classifying each neighbouring cell of the source cell into one of: a first group, a second group, based on a location of said neighbouring cell, wherein the first group includes neighbouring cells which are located inside the effective area of the source cell whereas the second group includes neighbouring cells which are located outside the effective area of the source cell;
  calculating a share of handover events from the source cell to the neighbouring cells in the first group using the first cell data; and
  when the share of handover events from the source cell to the neighbouring cells in the first group lies below a first predefined threshold, filtering out at least one neighbouring cell from amongst the second group with which a number of handover events of the source cell lies above a second predefined threshold and determining the source cell to be a cross-connected cell when:
    a direction of any of the at least one filtered cells is opposite to a direction of the source cell; and/or
    an effective area of at least one filtered cell does not overlap with the effective area of the source cell.

In a second aspect, the embodiment of the present disclosure provides a system for automatically detecting cross-connected cells in a communication network according to the first aspect, the system comprising a data repository configured to store at least first cell data of a source cell within the communication network, and a controller communicably coupled to the data repository, wherein the controller is configured to execute steps of the computer-implemented method.

In a third aspect, the embodiment of the present disclosure provides a computer program product for automatically detecting cross-connected cells in a communication network, the computer program product comprising a non-transitory machine-readable data storage medium having stored thereon program instructions that, when accessed by a processing device, cause the processing device to execute steps according to the first aspect.

Embodiments of the present disclosure substantially eliminate or at least partially address the aforementioned problems in the prior art, and enable efficient automatic detection of cross-connected cells.

Additional aspects, advantages, features and objects of the present disclosure would be made apparent from the drawings and the detailed description of the illustrative embodiments construed in conjunction with the appended claims that follow.

It will be appreciated that features of the present disclosure are susceptible to being combined in various combinations without departing from the scope of the present disclosure as defined by the appended claims.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings.

However, the present disclosure is not limited to specific methods and instrumentalities disclosed herein. Moreover, those skilled in the art will understand that the drawings are not to scale. Wherever possible, like elements have been indicated by identical numbers.

Embodiments of the present disclosure will now be described, by way of example only, with reference to the following diagrams wherein.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION OF EMBODIMENTS

The following detailed description illustrates embodiments of the present disclosure and ways in which they can be implemented. Although some modes of carrying out the present disclosure have been disclosed, those skilled in the art would recognize that other embodiments for carrying out or practising the present disclosure are also possible.

In a first aspect, the embodiment of the present disclosure provides a computer-implemented method for automatically detecting cross-connected cells in a communication network, the method comprising:

obtaining first cell data of a source cell within the communication network;

determining an effective area of the source cell using the first cell data;

classifying each neighbouring cell of the source cell into one of: a first group, a second group, based on a location of said neighbouring cell, wherein the first group includes neighbouring cells which are located inside the effective area of the source cell whereas the second group includes neighbouring cells which are located outside the effective area of the source cell;

calculating a share of handover events from the source cell to the neighbouring cells in the first group using the first cell data; and when the share of handover events from the source cell to the neighbouring cells in the first group lies below a first predefined threshold, filtering out at least one neighbouring cell from amongst the second group with which a number of handover events of the source cell lies above a second predefined threshold and determining the source cell to be a cross-connected cell when:

a direction of any of the at least one filtered cells is opposite to a direction of the source cell; and/or an effective area of at least one filtered cell does not overlap with the effective area of the source cell.

Typically, when the share of handover events from the source cell to the neighbouring cells in the first group lies below a first threshold, it means that a significant share of handovers from the source cell are triggered to cells outside of the effective area of the source cell. As an alternative example of the method is that we first classify the cells to a first group and a second group. After that we analyse handover events of both the first group and the second group. If number of handover events associated with the first group is too small (in relation on what is expected i.e. below the first predefined threshold), we will then filter (or select) from the second group at least one cell for which the number of handover events is too high (in relation on what is expected i.e. above the second predetermined threshold). This can be used as an intermediate result to conclude that there is a possible cross-connected cell. As a further step, the direction of the filtered cell (from the second group) is checked and/or the effective area of the filtered cell is checked. If direction is opposite and/or the effective area does not overlap then the cell is detected to be a cross-connected cell.

In a second aspect, the embodiment of the present disclosure provides a system for automatically detecting cross-connected cells in a communication network according to the first aspect, the system comprising a data repository configured to store at least first cell data of a source cell within the communication network, and a controller communicably coupled to the data repository, wherein the controller is configured to execute steps of the computer-implemented method.

In a third aspect, the embodiment of the present disclosure provides a computer program product for automatically detecting cross-connected cells in a communication network, the computer program product comprising a non-transitory machine-readable data storage medium having stored thereon program instructions that, when accessed by a processing device, cause the processing device to execute steps according to the first aspect.

The computer-implemented method is an open-loop use case, that gives an output of a list of cells identified as cross-connected cells for network engineers to verify. Since, newly cross-connected cells do not appear frequently in the communication network, the computer-implemented method may be implemented intermittently (either after regular intervals or after irregular intervals), thereby resulting into a less tedious process for cross-connected cell detection as compared to conventional solutions for the same. The computer-implemented method in the present disclosure may be scheduled, for example, daily, weekly or monthly, as required or desired. The method may be run parallelly for different communication technologies, and provides a detailed analysis upon such running on a user device. As a result, the need for network engineers to perform manual testing on each cell in the communication network is reduced, and the network engineers need to only focus only on the cross-connected cells that are automatically identified by the system. Advantageously, parameters related to the communication network may be modified dynamically.

Throughout the present disclosure, the term "communication network" refers to a network that is distributed over land areas termed as "cells", wherein each cell is communicably coupled with fixed transceivers arranged on an antenna. Typically, the cells belong to different set of frequencies and/or technologies as compared to neighbouring cells, so as to avoid interference with the neighbouring cells. Examples of the frequencies can include, but is not limited to, 700-megahertz (MHz) band, 800 MHz band, personal communication services (PCS) band, advanced wireless services (AWS) band. Examples of the technologies can include, but is not limited to, Global System for Mobile Communications (GSM), General Packet Radio Service (GPRS), Long-Term Evolution (LTE), Wideband Code Division Multiple Access (WCDMA), New radio (NR). The cells are joined together to form a cell-site, that provides communication/radio coverage over a vast geographical area. Additionally, a specific set of frequencies and/or technology can have multiple cells in the cell-site. Each cell-site has at least one antenna that points in various directions. In an embodiment, the antenna can function as a transmitter, a receiver or a combination of both. The antenna used in the communication network is a directional antenna. Herein, the directional antenna can transmit and/or receive signals in a particular desired direction. The directional antenna emits radiation of the signal in various radiation patterns, wherein the radiation patterns are divided into a main lobe and several minor lobes. The main lobe exhibits maximum signal in the particular desired direction. The minor lobes represent unwanted signals in undesired directions. The main lobe has a field strength (i.e., both magnetic field strength and electrical field strength) larger than that of the minor lobes.

It will be appreciated that, each cell in the communication network can be represented as a hexagonal cell, wherein the hexagonal cells are laid next to each other with no gaps and overlapping. Therefore, the hexagonal cells help visualize the communication network in the vast geographical area. The antenna is placed at an intersection of three hexagonal cells, and are connected to the three hexagonal cells with the help of antenna feeders. Each cell may have at least one antenna feeder connected to the cell. Typically, the antenna feeders are connected to the antenna facing in the direction intended for the cell at the cell-site.

Throughout the present disclosure, the term "cross-connected cells" refers to a situation of cross-connection when the antenna feeders of at least two cells in a given cell-site are interchanged either during the initial installation or during routine maintenance of the cell-site. Alternatively, the term "cross-connected cells" refers to a situation of cross-connection when several antenna feeders are connected to an incorrect antenna of the same or the other cell. This changes standard configurations of the at least two cells at the cell-site from the actual configurations of the at least two cells.

The source cell is the cell associated with the antenna present at the intersection of the three hexagonal cells, wherein the antenna faces a definite direction. The definite direction of the antenna helps to obtain the first cell data of the source cell, by distinguishing number of the neighbouring cells of the source cell surrounding the antenna. Herein, a given number of neighbouring cells may be in the definite direction of the antenna, but the remaining number of neighbouring cells may not be in the definite direction of the antenna.

Optionally, the first cell data of the source cell comprises at least: a location, an azimuth, an antenna beamwidth, frequency band information, and handover data obtained for a measurement period, of the source cell. In one embodiment the first cell data of the source cell comprises at least one item of the previous list. The location of the source cell may be a location of a cell-site of the source cell within the communication network in World Geodetic System 1984 (WGS84) format in decimal degrees. The azimuth of the source cell can be adjusted to maintain low interference among the neighbouring cells, and is represented in a degree format. The antenna beamwidth refers to determination of expected signal strength of the antenna, when given the direction and radiation distance of the antenna. Furthermore, the antenna beamwidth is an area in the source cell where most power of the antenna is radiated. Technical effect of using the beamwidth is to take in account radiation pattern. The pattern can be further used to adjust threshold values to higher or lower. The frequency band information of the source cell may range from medium frequency to ultra-high frequency. The handover data comprises handover rate of the source cell, wherein the handover rate is defined as expected number of handover events per unit time. Example of handover event is attempt to do an handover or success full handover or other event related to preparation or executing of finalizing a handover. Indeed handover event can comprise for example handover attempts and related data. Furthermore, the handover data represents number of times an ongoing communication is transferred from one channel connected to the source cell to another channel of the neighbouring cell. Additionally, the handover data is validated based on an adequate number of samples of handover events, and whether the source cell has adequate number of neighbouring cells. The measurement period of the handover data is defined as number of days for which the handover data is being collected, wherein default value of the measurement period may be 14 days.

Optionally, the computer-implemented method further comprises:
    obtaining configuration data and inventory management data of the communication network; and
    validating the first cell data based on the configuration data and the inventory management data.

In this regard, the configuration data and inventory management data may be stored in the data repository. The data repository may collect, manage and store the configuration data and the inventory management data for further analysis. Furthermore, the validation of the first cell data is used to validate accuracy, clarity and details of the first cell data to mitigate any faults that may affect determination of a source cell to be a cross-connected cell. Examples of the configuration data and the inventory management data may include, but is not limited to, intra-Radio Access Technology (intra-RAT) of the source cell in the same cell-site, intra-frequency of the source cell, number of co-site intra-frequency cells, location type of the source cell within the communication network, number of samples of handover events, a number of relative cell bearings, number of antennas used, frequency or technology used. The number of co-site intra-frequency cells has a default value greater than one neighbouring cell with intra-frequency. The location type of the source cell is compatibility of the location of the source cell within the communication network. The number of relative cell bearings has a default value of greater than one relative cell bearing. In an embodiment, the computer-implemented method further comprises obtaining performance management data that includes statistics regarding the number of handover events from the source cell to the neighbouring cells for the measurement period of the source cell.

Optionally, the computer-implemented method further comprises:
- determining whether the number of handover events of the source cell are equal to or greater than a handover count threshold;
- determining whether a number of neighbouring cells of the source cell are equal to or greater than a neighbour count threshold; and
- validating the handover data when it is determined that the number of handover events of the source cell are equal to or greater than the handover count threshold and the number of neighbouring cells of the source cell are equal to or greater than the neighbour count threshold.

The handover count threshold is defined as a minimum number of total handover events per source cell, wherein default value of the handover count threshold may be 500 handover events per source cell. The neighbour count threshold is defined as a minimum number of co-site neighbouring cells per the source cell. The default value of the neighbour count threshold may be 4 neighbouring cells per the source cell. Furthermore, default value of the neighbour count threshold towards the antenna beamwidth per the source cell may be 3 neighbouring cells per source cell. For instance, the source cell may have 500 handover events and the number of neighbouring cells of the source cell may be 8, then the handover data is validated.

The term "effective area" of the source cell is defined as an expected coverage area of the source cell. The effective area of the source cell can be dynamic or hardcoded. The handover events of the source cell with the neighbouring cells present in the first cell data is desired to determine the effective area of the source cell.

Optionally, the step of determining the effective area of the source cell using the first cell data comprises:
- determining, from the first cell data, at least two closest co-site cells of the source cell and an angular distance between the at least two closest co-site cells and the source cell;
- obtaining an input pertaining to an effective bearing margin;
- determining whether said angular distance is less than an antenna beamwidth of the source cell; and
- calculating the effective area of the source cell as a sum of the antenna beamwidth of the source cell and the effective bearing margin, when it is determined that said angular distance is less than the antenna beamwidth of the source cell.

In this regard, determining the effective area of the source cell helps determine strength of the signal in a particular direction, wherein the strength of the signal is stronger in the main lobe and weaker in the minor lobes. The at least two co-site cells are the neighbouring cells in closest proximity to the source cell. The at least two closest co-site cells use the same frequency as the source cell. Furthermore, the interference of the at least two closest co-site cells with the source cell determined using the first cell data, is at an acceptable level. For example, a communication network may comprise a hexagonal cell A, a hexagonal cell B, and a hexagonal cell C laid in closest proximity to each other with no gaps or overlapping. The hexagonal cell A may be considered to be the source cell, then the hexagonal cell B and hexagonal cell C may be the at least two co-site cells. The minimum angular distance between the at least two closest co-site cells and the source cell may be 120 degrees. The effective bearing margin helps determine tolerance of the effective area of the source cell since the radiation pattern of the directional antenna is an expanding pattern. The effective bearing margin may be a positive margin or a negative margin. Herein, the effective bearing margin of the effective area of the source cell is in degrees, wherein default value of the effective bearing margin may be 15 degrees. In case the angular distance of the source cell to the at least two closest co-site cells is less than the antenna beamwidth of the source cell, then the effective area is calculated as a sum of the antenna beamwidth of the source cell and the effective bearing margin.

Optionally, the step of determining the effective area of the source cell using the first cell data comprises:
- obtaining area information indicative of the effective area of the source cell; and
- processing the area information with respect to the first cell data for determining the effective area of the source cell.

In this regard, the area information is beneficially utilized for determining the effective area of the source cell as it is indicative of the effective area of the source cell. The area information of the source cell may be indicative of a shape of the effective area, wherein the shape may be a circle, an ellipse, a quadrilateral, a curved triangle, an octagon and so forth. The area information can be in any graphic format that is capable of defining the shape of the effective area. Examples of the graphic format may include, but is not limited to, bitmap, JPG or JPEG, PNG. Hence, the effective area of the source cell is dynamic, hence the requirement to process the area information with respect to the first cell data of the source cell.

The classification of the neighbouring cells of the source cell into a first group and the second group helps in establishing a relationship between the source cell and the neighbouring cells present in the first group and the second group. The second group is located in the minor lobes and in a back lobe of the antenna. The back lobe is a given minor lobe directly behind the main lobe. The first group and the second group are classified based on validation of the number of handover events in the first cell data based on the configuration data and the inventory management data. The relative cell-bearing from the source cell to the first group is determined. For example, the area information of the source cell may indicate the shape of the effective area to be a sector of a circle. The source cell and the at least two closest co-site cells are present at centre of the sector of the circle. The neighbouring cells located inside the sector of the circle is classified as the first group. Simultaneously, the neighbouring cells located outside the sector of the circle is classified as the second group.

The share of handover events from the source cell towards the first group is typically higher than the number of handover events from the source cell towards the second group. The share of handover events is a summation of the handover data present in the first cell data, and successful number of handover events of the source cell to each neighbouring cell present in the first group. In case, the relative cell bearing of the first group is within the effective area of the source cell, then the number of handover events of the source cell to the first group is further added to the share of handover events. Subsequently, the summation continues simultaneously for every neighbouring cell present in the first group.

The first threshold may be calculated dynamically, and may not be necessarily fixed. The first threshold is a minimum required share of handover events from the source cell to the neighbouring cells in the first group for the source cell to not be considered a potentially cross-connected cell. The second threshold is a maximum number of handover events from the source cell to the neighbouring cells in the second group, for the source cell to not be considered a potentially cross-connected cell. Herein, the number of neighbouring cells can be greater than a minimum number of co-site neighbouring cells per source cell to calculate the share of handover events from a total share of handover events. The direction of the at least one filtered cell is determined using the first cell data. The direction of the at least one filtered cell can have a minimum difference in degrees between the source cell and the at least one filtered cell with successful share of handover events, wherein the minimum difference in degrees may be 120 degrees. The effective area of the at least one filtered cell is defined, and if the effective area of the at least one filtered cell does not overlap with the effective area of the source cell, then the at least one filtered cell is determined to be a cross-connected cell.

In a first scenario, typically, the neighbouring cells in the first group should have higher number of handover events from the source cell as compared to the neighbouring cells in the second group. This ensures low interference, better uplink signal level and good performance. However, when the number of handover events from the source cell to the first group is lower than the first threshold, it signifies that a problem has occurred in the cell-site involving said source cell. The source cell is considered to be a potentially cross-connected cell. In a second scenario, the neighbouring cells in the second group are located outside the effective area of the source cell, thereby no handover attempt from the source cell is typically initiated towards the second group. However, the source cell contradictorily initiates a number of handover events to the neighbouring cells in the second group. Hence, the source cell is considered to be a potentially cross-connected cell.

Optionally, the first threshold lies in a range of 0 to 40 percent of a total share of handover events from the source cell. As an example, a default value of the first threshold may be 10 percent of the total share of handover events from the source cell. The first threshold may lie in a range from 0, 5, 10, 20, or 30 percent up to 20, 30, 35 or 40 percent. In an instance, the first threshold may be 30 percent of the total share of handover events from a source cell X. When the share of handover events from the source cell X is 10 percent of the total share of handover events from the source cell X, then the source cell X is considered to be a potential cross-connected cell. Conversely, when the share of handover events from the source cell X is 70 percent of the total share of handover events from the source cell X, then the source cell X is not considered to be a potential cross-connected cell.

Optionally, the second threshold lies in a range of 8 to 13. The second threshold is represented in percent of the total share of handover events from the source cell. As an example, a default value of the second threshold may be 8. The second threshold may lie in a range from 8, 9, or 12 up to 9, 12 or 13. Continuing from the previous instance, the second threshold may be 10. When the number of handover events from the source cell X is 5, then the source cell X is not considered to be a potential cross-connected cell. Conversely, when the number of handover events from the source cell X is 20, then the source cell X is considered to be a potential cross-connected cell. Indeed, calculation of handover events from the source cell to the first and second group of cells has been found to be efficient way to determine if the source cell is cross-connected or not. If the source cell is determined to be cross-connected cell a corrective action can be initialized to correct the situation.

Optionally, the direction of the at least one filtered cell is opposite to the direction of the source cell when a difference between said directions lies in a range of 120 degrees to 180 degrees. The difference between said directions may lie in a range from 120, 125, 130, 140 or 150 degrees up to 135, 145, 160, 170, 175 or 180 degrees. Continuing from the previous instance, the direction of the at least filtered cell may be 150 degrees. The direction of the at least one filtered cell may be set globally. The direction of the at least one filtered cell may be calculated per the at least one filtered cell, depending on characteristics or features of the at least one filtered cell. In case the at least one filtered cell fulfils the previous instances, then source cell may be considered to be the cross-connected cell.

Optionally, default value of the first cell data of the source cell differs for different technologies used, such as for LTE, GSM, WCDMA and NR. For example, the first threshold of the source cell for LTE may be 20 percent of the total share of handover events from the source cell in the LTE. Similarly, the first threshold of the source cell for GSM may be 40 percent of the total share of handover events from the source cell in the GSM. Similarly, the first threshold of the source cell for WCDMA may be 30 percent of the total share of handover events from the source cell in the WCDMA. Similarly, the first threshold of the source cell for NR may be 40 percent of the total share of handover events from the source cell in the NR. Some exemplary default (measured) values that can be associated with the first cell data of the source cell are as shown in Table 1 given below:

| FIRST CELL DATA | DEFAULT VALUE (LTE) | DEFAULT VALUE (GSM) | DEFAULT VALUE (WCDMA) | DEFAULT VALUE (NR) |
| --- | --- | --- | --- | --- |
| Measurement period in days | 14 | 14 | 14 | 14 |
| Effective bearing margin in degrees | 10 | 0 | 0 | 0 |
| Total share of handover events | 1000 | 200 | 1000 | 1000 |
| Neighbour count threshold | 4 | 2 | 2 | 2 |
| Neighbour count threshold in the first group | 3 | 1 | 1 | 1 |
| Second threshold in percent | 10 | 13 | 13 | 13 |
| Minimum angular distance in degrees between the source cell and the neighbouring cell | 130 | 135 | 135 | 135 |
| First threshold in percent | 20 | 40 | 30 | 40 |

Optionally, the method further comprises,
obtaining second cell data of the at least one filtered cell;
determining, using the second cell data, the direction of the at least one filtered cell and/or the effective area of the at least one filtered cell.
determining whether the effective area of the at least one filtered cell overlaps with the effective area of the source cell.

In this regard, in case the effective area of the at least one filtered cell overlaps with the effective area of the source cell, then the source cell is not considered as a potential cross-connected cell. This further helps to accurately determine whether a given source cell is a potential cross-connected cell. The second cell data comprises at least: a location, an azimuth, frequency band information, and handover data obtained for a measurement period, of the at least one filtered cell. The second cell data further comprises a number of handover events from the source cell to the at least one filtered cell. The at least one filtered cell may be a neighbouring cell outside the effective area with a significant number of handover events which is pointing to nearly opposite direction of the source cell. Optionally, the computer-implemented method further comprises determining a difference between the direction of the at least one filtered cell and the direction of the source cell. Optionally, the computer-implemented method further comprises determining whether the effective area of the at least one filtered cell overlaps with the effective area of the source cell. The at least one filtered cell may be a neighbouring cell outside the effective area of the source cell with a significant number of handover events which are not pointing to nearly opposite direction of the source cell. Furthermore, the effective area of the at least one filtered cell intersects with the effective area of the source cell.

Throughout the present disclosure, the term "user device" refers to an electronic device that is capable of a graphical user interface. The user device is associated with (or used by) a user and is capable of enabling the user to perform specific tasks associated with the method. Furthermore, the user device is intended to be broadly interpreted to include any electronic device that may be used to facilitate decision-making of the user, by at least displaying the visual content. Examples of the user device include, but are not limited to, laptop computers, personal computers, cellular phones, personal digital assistants (PDAs), handheld devices etc. Additionally, the user device includes a casing, a memory, a processor, a network interface card, a microphone, a speaker, a keypad, and a display. Advantageously, the user device displays output of all the steps in the method of the invention.

Optionally, the method further comprises:
rendering a graphical user interface on a display of a user device; and
providing, on the graphical user interface, a visual indication of each cross-connected cell in the communication network.

In this regard, the rendering of the graphical user interface may run on a cloud environment, wherein potentially cross-connected cells can be displayed on the graphical user interface. The visual indication of each cross-connected cell in the communication network may be in a form of distinctly-coloured arrows in a Keyhole Markup language Zipped (KMZ) file, which can be opened and studied in Google Earth®. In an example, all cross-connected cells in the communication network may be visually indicated using a black colour. Furthermore, at a given cell-site, different types of cells may be visually represented differently with respect to each other. In an example, at a given cell-site, the source cell may be visually indicated by a navy-blue arrow, the first group may be visually indicated by a sky-blue arrow, the at least one filtered cell in the second group pointing in a direction opposite to the source cell may be visually indicated by a red arrow, and the at least one filtered cell in the second group pointing in a direction similar to the source cell with an overlapping effective area (i.e., overlapping with the effective area of the source cell) may be visually indicated by a yellow arrow. Optionally, a comma-separated values (CSV) file may be used, wherein the handover data, key-performance indicators (KPIs) used for analysis and other required data, of the source cell and the neighbouring cells are saved. This information can be downloaded from the graphical user interface. For high-level monitoring of the cross-connected cells in the communication network, various graphs are presented on the user device, wherein the graphs may show, total number of cells identified as potential cross-connected cells, number of neighbouring cells excluded from consideration and so forth.

The present disclosure also relates to the system as described above. Various embodiments and variants disclosed above, with respect to the aforementioned method, apply mutatis mutandis to the system.

Throughout the present disclosure, the term "data repository" refers to hardware, software, firmware, or a combination of these for storing a given information in an organized (namely, structured) manner, thereby, allowing for easy storage, access (namely, retrieval), updating and analysis of the given information. The data repository may be implemented as a memory of a device (such as the imaging system, the display apparatus, or similar), a removable memory, a cloud-based database, or similar. The data repository can be implemented as one or more storage devices. A technical effect of using the data repository is that is provides an ease of storage and access of processing inputs, as well as processing outputs.

Throughout the present disclosure, the term "controller" refers to a computational device that is operable to respond to and process information. In an example, the controller may be an embedded microcontroller, a microprocessor, computer or a portable computing device. Herein, the controller is in signal communication with the memory. Furthermore, the controller may be a digital circuit that manages the flow of data going to and from the memory and performs processing tasks.

Optionally, the controller is communicably coupled to a user device, the controller being configured to:
render a graphical user interface on a display of the user device; and
provide, on the graphical user interface, a visual indication of each cross-connected cell in the communication network.

The present disclosure also relates to the computer program product as described above. Various embodiments and variants disclosed above, with respect to the aforementioned method and the aforementioned system, apply mutatis mutandis to the computer program product.

The computer program product for automatically detecting cross-connected cells in a communication network, the computer program product comprising a non-transitory machine-readable data storage medium having stored thereon program instructions that, when accessed by a processing device, cause the processing device to execute steps of the aforementioned method. The term "computer program product" refers to a software product comprising program instructions that are recorded on the non-transitory machine-readable data storage medium, wherein the software product is executable upon a computing hardware for implementing the aforementioned steps of the method for automatically detecting cross-connected cells in a communication network.

In an embodiment, the non-transitory machine-readable date storage medium can direct a machine (such as computer, other programmable data processing apparatus, or other devices) to function in a particular manner, such that the program instructions stored in the non-transitory machine-readable data storage medium case a series of steps to implement the function specified in a flowchart corresponding to the instructions. Examples of the non-transitory machine-readable data storage medium includes, but is not limited to, an electronic storage device, a magnetic storage device, an optical storage device, an electromagnetic storage device, a semiconductor storage device, a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, or any suitable combination thereof.

Experimental Part

Figure 8A:
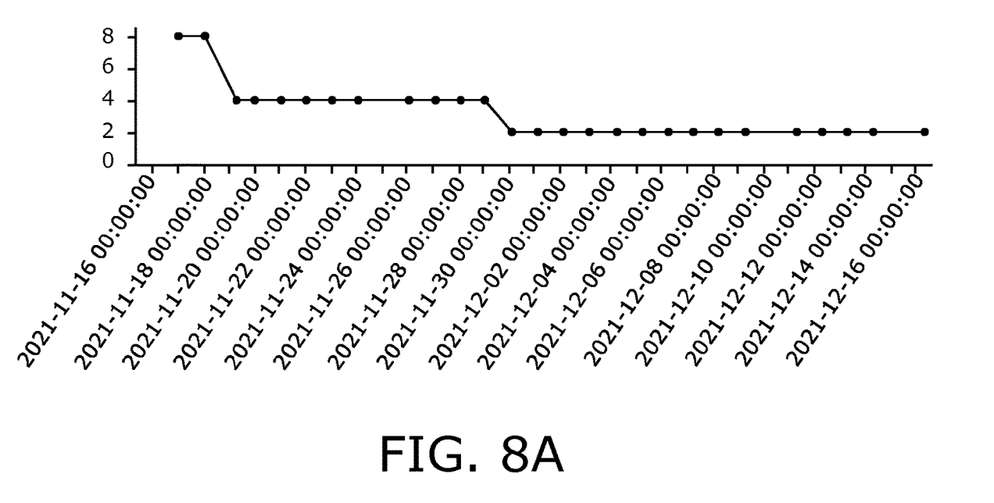
FIGS. 8A, 8B and 8C collectively illustrate exemplary graphical representations for high-level monitoring of the cross-connected cells in the communication network, in accordance with an embodiment of the present disclosure.
Figure 8B:
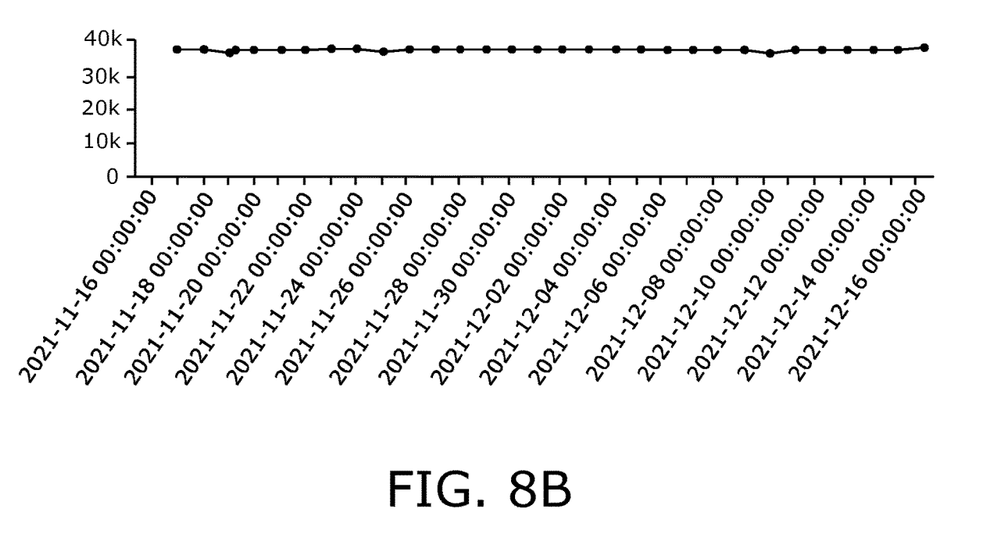
Figure 8C:
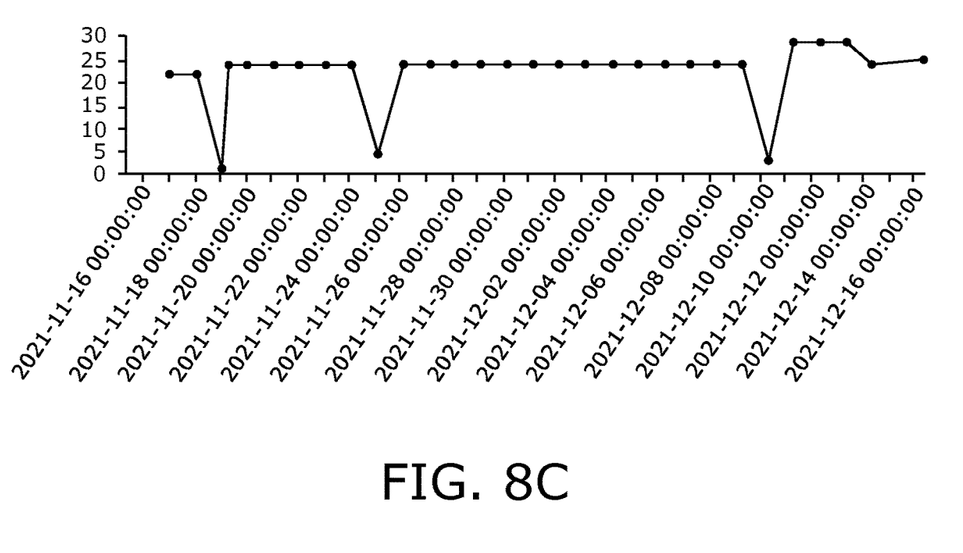

A high-level monitoring of results of implementing the method for automatically detecting the cross-connected cells in the communication network was performed. Graphical representations of various performance metrics and other related information were generated. Some of these graphical representations are shown in FIGS. 8A, 8B, and 8C. The method was also run separately for different communication technologies.

DETAILED DESCRIPTION OF THE DRAWINGS

Figure 1A:
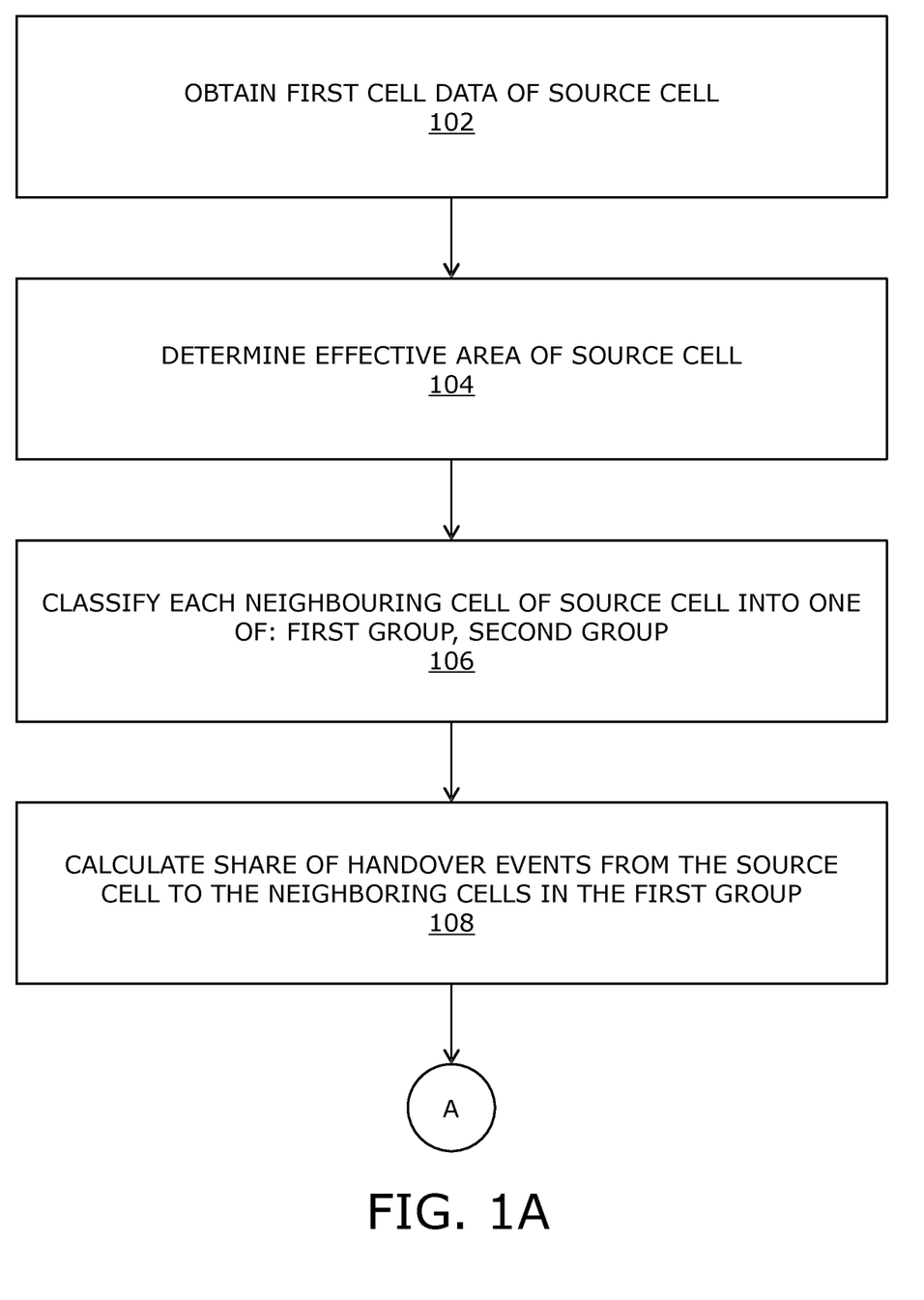
FIG. 1 is an illustration of steps of a computer-implemented method for automatically detecting cross-connected cells in a communication network, in accordance with an embodiment of the present disclosure.
Figure 1B:
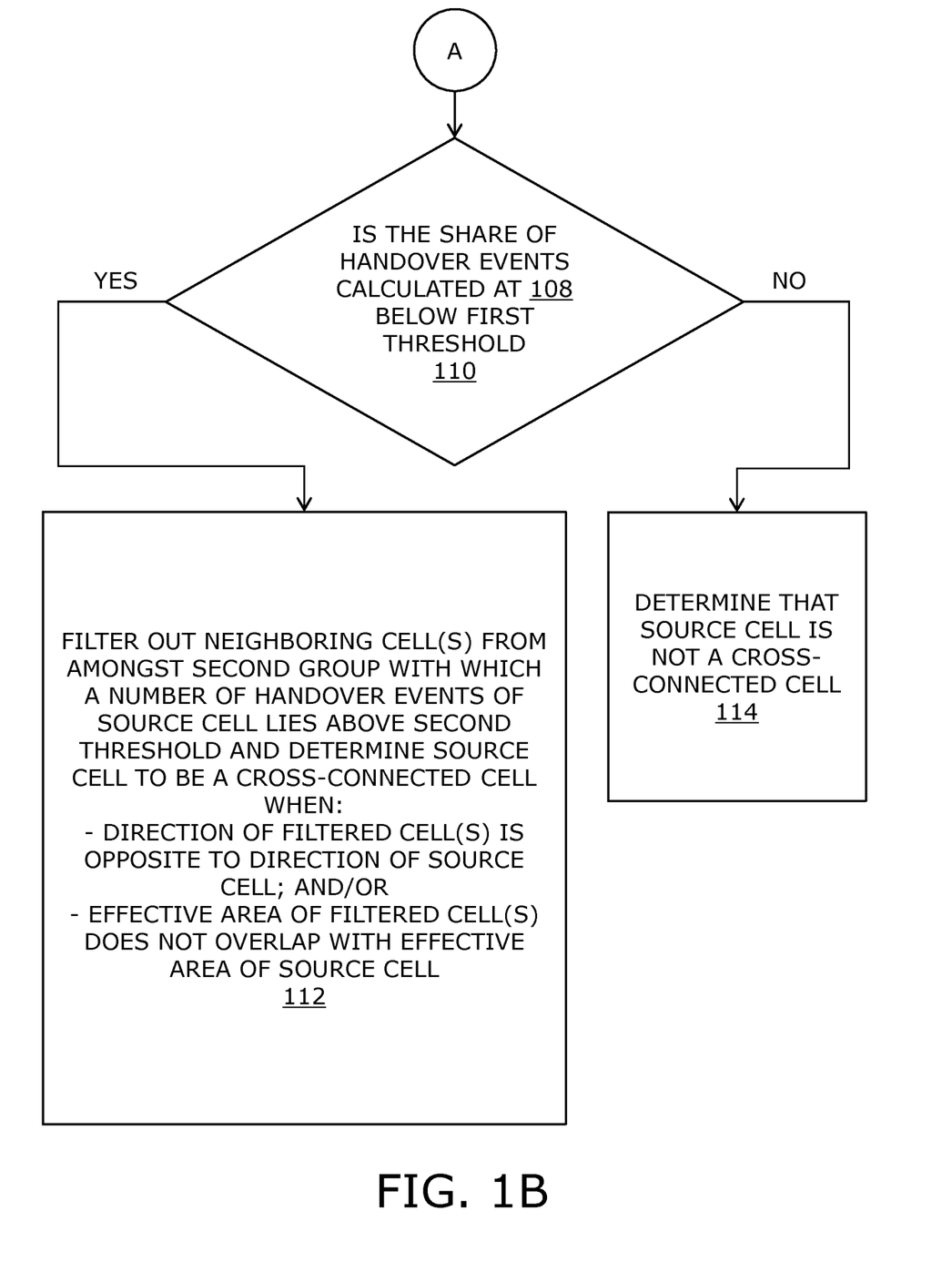

Referring to FIG. 1, illustrated are steps of a computer-implemented method for automatically detecting cross-connected cells in a communication network, in accordance with an embodiment of the present disclosure. At step 102, first cell data of a source cell is obtained within the communication network. At step 104, an effective area of the source cell is determined using the first cell data. At step 106, each neighbouring cell of the source cell is classified into one of: a first group, a second group, based on a location of said neighbouring cell, wherein the first group includes neighbouring cells which are located inside the effective area of the source cell whereas the second group includes neighbouring cells which are located outside the effective area of the source cell. At step 108, a share of handover events is calculated from the source cell to the neighbouring cells in the first group using the first cell data. Optionally, at step 110, the computer-implemented method further comprises determining whether the share of handover events from the source cell to the neighbouring cells in the first group lies below the first threshold. When the share of handover events from the source cell to the neighbouring cells in the first group lies below a first threshold, at step 112, at least one neighbouring cell is filtered out from amongst the second group. In deed this might refer to a situation that in said situation significant share of handovers take place outside of the effective area. Furthermore, when a number of handover events of the source cell lies above a second threshold the source cell is determined to be a cross-connected cell when: a direction of at least one filtered cell is opposite to a direction of the source cell; and/or an effective area of at least one filtered cell does not overlap with the effective area of the source cell. Otherwise, when the number of handover events of the source cell lies above the first threshold, at step 114, the source cell is not determined to be a cross-connected cell.

The aforementioned steps are only illustrative and other alternatives can also be provided where one or more steps are added, one or more steps are removed, or one or more steps are provided in a different sequence without departing from the scope of the claims herein.

Figure 2:
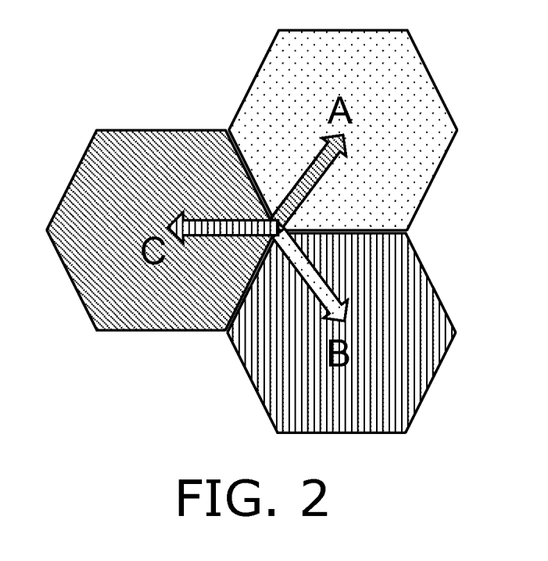
FIG. 2 is an exemplary representation of cross-connected cells in the communication network, in accordance with an embodiment of the present disclosure.

Referring to FIG. 2, there is shown an exemplary representation of cross-connected cells in the communication network, in accordance with an embodiment of the present disclosure. A typical cell-site may comprise three cells as shown: Cell A, Cell B and Cell C, laid next to each other with no gaps or overlapping therebetween. Herein, each cell in the communication network is represented for example as a hexagonal cell, and each of the cells A, B and C are connected with an antenna feeder (depicted as arrows within the cells). Typically, Cell A (having a dotted hatch) is supposed to be connected to a Feeder A (having the dotted hatch), Cell B (having a straight hatch) is supposed to be connected to Feeder B (having the straight hatch), and Cell C (having a diagonal hatch) is supposed to be connected to Feeder C (having the diagonal hatch). In simple words, a given cell and its (ideal) correct feeder are represented with a same hatch. The problem of cross-connected cells arises when the cells are connected with the wrong antenna feeders. For example, as shown, the Cell A is connected to the Feeder C, the Cell B is connected to the Feeder A, and the Cell C is connected to the Feeder B.

Figure 3:
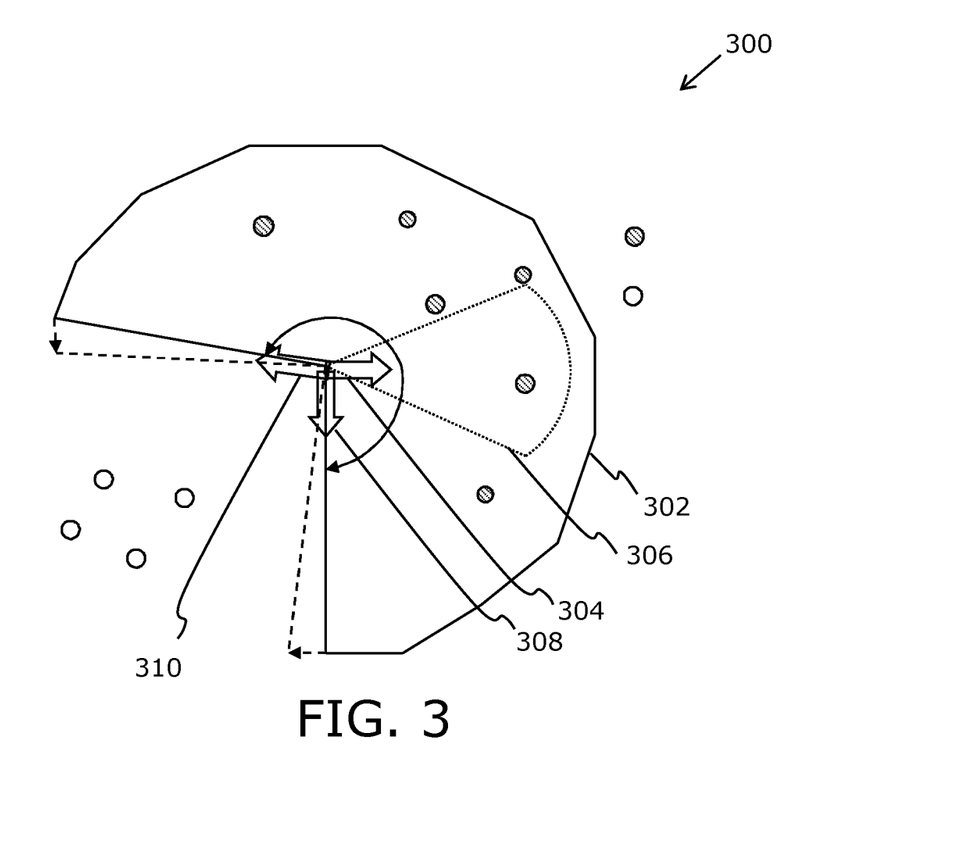
FIG. 3 is an exemplary representation of effective area of a source cell, in accordance with an embodiment of the present disclosure.

Referring to FIG. 3, there is shown an exemplary representation 300 of effective area 302 of a source cell 304, in accordance with an embodiment of the present disclosure. The source cell 304 has a first cell data associated therewith, wherein the first cell data comprises at least: a location, an azimuth, and an antenna beamwidth 306, of the source cell 304. The effective area 302 of the source cell 304 is determined by: determining, from the first cell data, at least two co-site cells 308, 310 of the source cell 304, and an angular distance between the at least two co-site cells 308, 310 and the source cell 304; obtaining an input pertaining to an effective bearing margin (as shown by the dashed lines on either ends of the effective area 302); determining whether said angular distance is less than the antenna beamwidth 306 of the source cell 304; and calculating the effective area 302 of the source cell 304 as a sum of the antenna beamwidth 306 of the source cell 304 and the effective bearing margin, when it is determined that said angular distance is less than the antenna beamwidth 306 of the source cell 304. Furthermore, each neighbouring cell of the source cell 304 is classified into one of: a first group, a second group, based on a location of said neighbouring cell, wherein the first group includes neighbouring cells which are located inside the effective area 302 of the source cell 304 whereas the second group includes neighbouring cells which are located outside the effective area 302 of the source cell 304.

Figure 4:
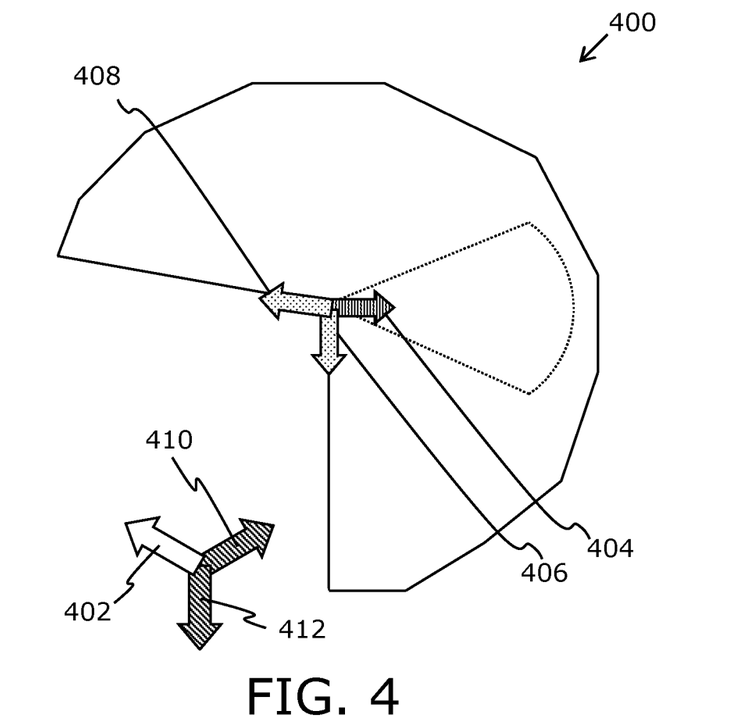
FIG. 4 is an exemplary representation of a direction of at least one filtered cell, in accordance with an embodiment of the present disclosure.

Referring to FIG. 4, there is shown an exemplary representation 400 of a direction of at least one filtered cell 402, in accordance with an embodiment of the present disclosure. Antenna beamwidth (shown as a dotted-outlined region) of a source cell 404 may be along a first direction as shown. Thus, the first direction is a direction of the source cell 404. Herein, directions of at least two closest co-site cells 406, 408 may be 90 degrees and 200 degrees, respectively, with respect to the direction of the source cell 404. A direction of the at least one filtered cell 402 (lying along the un-hatched arrow of the cell 402) may be opposite to the direction of the source cell 404 when a difference between said directions lies in a range of 120 degrees to 180 degrees. The direction of the at least one filtered cell 402 is shown to lie about 120 degrees from the direction of the source cell 404, thereby determining that the source cell 404 maybe a cross-connected cell. Cells 410 and 412 represent neighbouring cells of the source cell 404 that belong to a second group, but with whom a number of handover events of the source cell does not lie above a second threshold.

Figure 5:
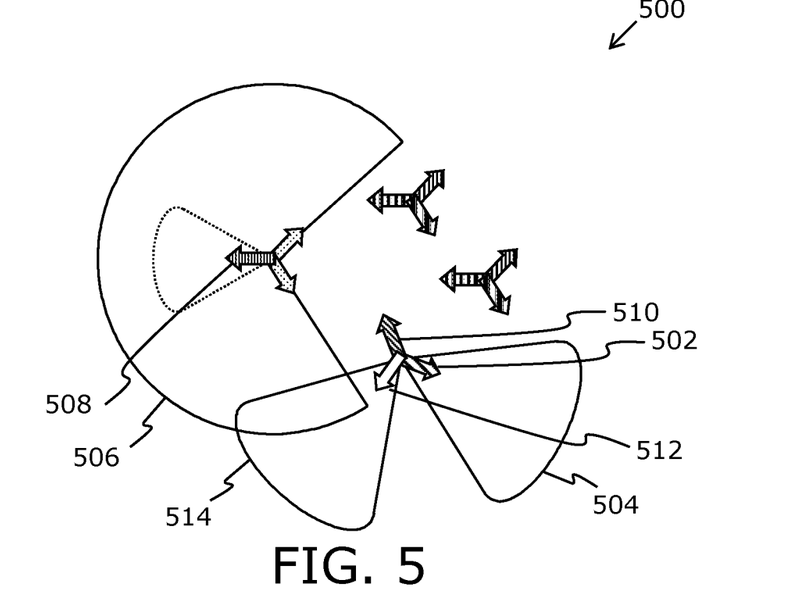
FIG. 5 is an exemplary representation of at least one filtered cell, in accordance with an embodiment of the present disclosure.

Referring to FIG. 5, there is shown an exemplary representation 500 of at least one filtered cell 502, in accordance with an embodiment of the present disclosure. The at least one filtered cell 502 (having a wide diagonal hatched arrow) has a second cell data, which is used to determine direction of the at least one filtered cell 502 and/or effective area 504 of the at least one filtered cell 502. The effective area 504 of the at least one filtered cell 502 does not overlap with effective area 506 of a source cell 508 (having a straight hatched arrow). A number of handover events of the at least one filtered cell 502 lies above a second threshold. The direction of the at least one filtered cell 502 is opposite to direction of the source cell 508. Hence, the source cell 508 is determined to be a cross-connected cell with respect to the at least one filtered cell 502. Cells 510 (having a narrow diagonal hatched arrow) and 512 represent neighbouring cells of the at least one filtered cell 502 that belong to a second group. In case of the cell 510, a number of handover events of the source cell does not lie above a second threshold. Therefore, the source cell 508 is not cross-connected with respect to the cell 510. Additionally, in case of the cell 512, the number of handover events of the source cell 508 lies above the second threshold, but effective area 514 of the cell 512 overlaps with the effective area 506 of the source cell 508. Furthermore, the cell 512 does not point opposite to the source cell 508. Therefore, the source cell 508 is not cross-connected with respect to the cell 512.

Figure 6:
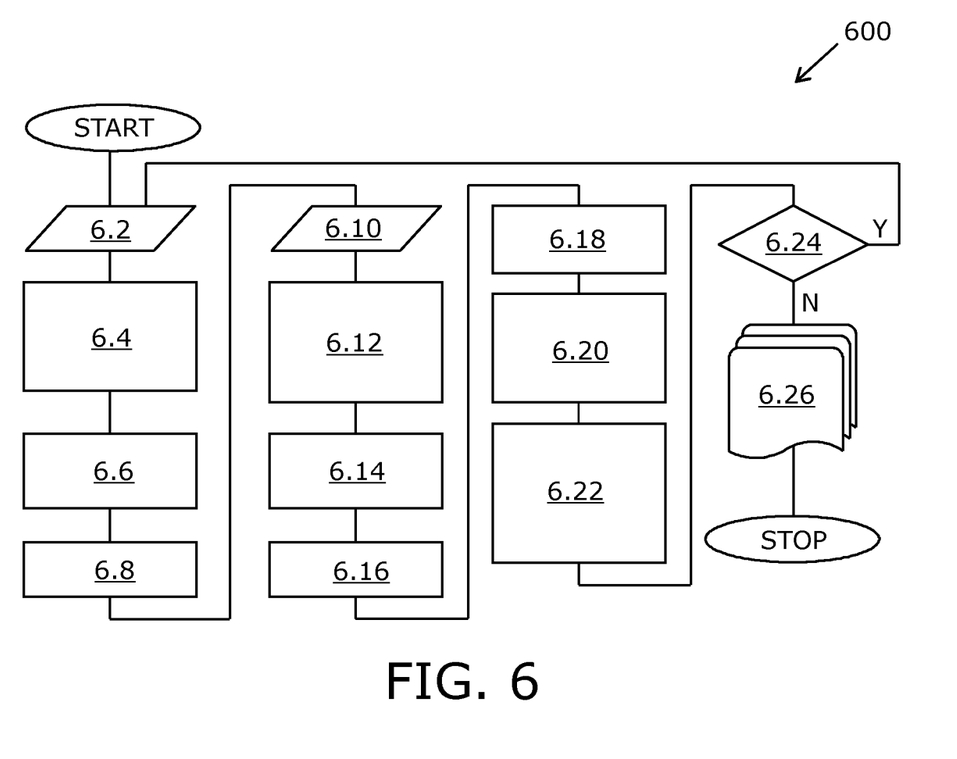
FIG. 6 is an exemplary process flow for automatically detecting cross-connected cells in a communication network, in accordance with an embodiment of the present disclosure.

Referring to FIG. 6, there is shown an exemplary process flow 600 for automatically detecting cross-connected cells in a communication network, in accordance with an embodiment of the present disclosure. At step 6.2, a first cell data of a source cell is obtained. At step 6.4, the first cell data is validated and filtered based on configuration data and inventory management data of the communication network (said data including a location type, number of antennas used, frequency or technology used, and so forth, of the source cell). At step 6.6, a handover data is fetched and validated based on an adequate number of samples of handover events, and whether the source cell has adequate number of neighbouring cells. At step 6.8, an effective area of the source cell is determined. At step 6.10, data for the neighbouring cells of the source cell is obtained. At step 6.12, handover attempt events in the handover data from the source cell to the neighbouring cells are validated and the neighbouring cells are validated based on the configuration data and the inventory management data. At step 6.14, each neighbouring cell of the source cell is classified into one of: a first group, a second group, based on a location of said neighbouring cell, wherein the first group includes neighbouring cells which are located inside the effective area of the source cell whereas the second group includes neighbouring cells which are located outside the effective area of the source cell. At step 6.16, difference in direction between the source cell and the neighbouring cells in the first group is determined. At step 6.18, a share of handover events from the source cell to the neighbouring cells in the first group is calculated. At step 6.20, when the share of handover events from the source cell to the neighbouring cells in the first group lies below a first threshold, then at least one neighbouring cell in the second group is filtered out. At step 6.22, the source cell is determined to be a cross-connected cell when a direction of at least one filtered cell is opposite to a direction of the source cell; and/or the effective area of the at least one filtered cell does not overlap with the effective area of the source cell. At step 6.24, it is checked whether more source cells are available, and if yes, then steps 6.2 to 6.22 are repeated. Otherwise, if more source cells are not available, then at step 6.26, a visual indication of each cross connected cell is provided and at least one: CSV file with calculated key performance indicators (KPIs) and ranking, and/or a KMZ file is created.

FIG. 6 is merely an example, which should not unduly limit the scope of the claims herein. A person skilled in the art will recognize many variations, alternatives, and modifications of embodiments of the present disclosure.

Figure 7:
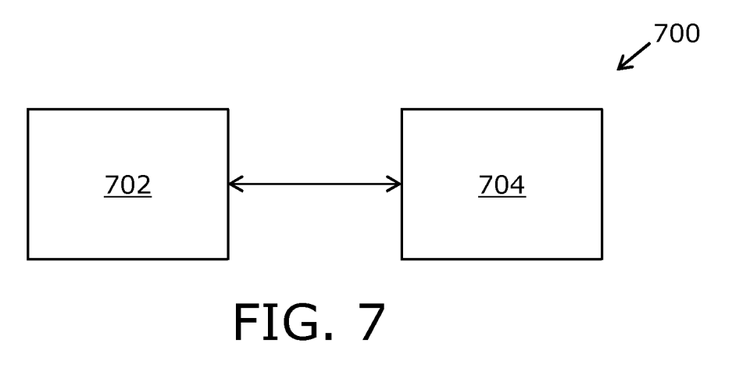
FIG. 7 is a block diagram of a system for automatically detecting cross-connected cells in a communication network, in accordance with an embodiment of the present disclosure.

Referring to FIG. 7, there is shown a block diagram of a system 700 for automatically detecting cross-connected cells in a communication network, in accordance with an embodiment of the present disclosure. The system 700 comprises a data repository 702 configured to store at least first cell data of a source cell within the communication network, and a controller 704 communicably coupled to the data repository 702, wherein the controller 704 is configured to execute steps of a computer-implemented method for automatically detecting the cross-connected cells in the communication network.

Referring to FIGS. 8A, 8B and 8C collectively, there are shown exemplary graphical representations for high-level monitoring of cross-connected cells in a communication network, in accordance with an embodiment of the present disclosure. FIG. 8A is a graphical representation of a number of cross-connected cells in a measurement period (shown, for example, as one month). FIG. 8B, is a graphical representation of number of cells excluded from an analysis of whether or not they are cross-connected cells, in the measurement period. FIG. 8C is a graphical representation of number of cells with an uneven topology, in the measurement period. The horizontal axes in FIGS. 8A, 8B and 8C represent various timestamps in the measurement period. The vertical axes in FIGS. 8A, 8B and 8C represent the number of cells.

The invention claimed is:

1. A computer-implemented method for automatically detecting cross-connected cells in a communication network, the method comprising:

obtaining first cell data of a source cell (304, 404, 508) within the communication network;

determining an effective area (302, 506) of the source cell (304, 404, 508) using the first cell data;

classifying each neighbouring cell of the source cell (304, 404, 508) into one of: a first group, a second group, based on a location of said neighbouring cell, wherein the first group includes neighbouring cells which are located inside the effective area (302, 506) of the source cell whereas the second group includes neighbouring cells which are located outside the effective area of the source cell;

calculating a share of handover events from the source cell (304, 404, 508) to the neighbouring cells in the first group using the first cell data; and when the share of handover events from the source cell (304, 404, 508) to the neighbouring cells in the first group lies below a first threshold, filtering out at least one neighbouring cell from amongst the second group with which a number of handover events of the source cell lies above a second threshold and determining the source cell to be a cross-connected cell when:

a direction of at least one filtered cell (402, 502) is opposite to a direction of the source cell; and/or an effective area (504) of at least one filtered cell (402, 502) does not overlap with the effective area (302, 506) of the source cell.

2. A computer-implemented method according to claim 1, wherein the first cell data of the source cell (304, 404, 508) comprises at least: a location, an azimuth, an antenna beamwidth, frequency band information, and handover data obtained for a measurement period, of the source cell.

3. A computer-implemented method according to claim 1 or 2, wherein the first threshold lies in a range of 0 to 40 percent of a total share of handover events from the source cell (304, 404, 508).

4. A computer-implemented method according to claim 1, 2 or 3, wherein the second threshold lies in a range of 8 to 13.

5. A computer-implemented method according to any of the preceding claims, wherein the direction of the at least one filtered cell (402, 502) is opposite to the direction of the source cell (304, 404, 508) when a difference between said directions lies in a range of 120 degrees to 180 degrees.

6. A computer-implemented method according to any of the preceding claims, wherein the step of determining the effective area (302, 506) of the source cell (304, 404, 508) using the first cell data comprises:
   determining, from the first cell data, at least two closest co-site cells of the source cell (304, 404, 508) and an angular distance between the at least two closest co-site cells (308, 310, 406, 408) and the source cell;
   obtaining an input pertaining to an effective bearing margin;
   determining whether said angular distance is less than an antenna beamwidth (306) of the source cell (304, 404, 508); and
   calculating the effective area (302, 506) of the source cell (304, 404, 508) as a sum of the antenna beamwidth (306) of the source cell and the effective bearing margin, when it is determined that said angular distance is less than the antenna beamwidth of the source cell.

7. A computer-implemented method according to any of claims 1-5, wherein the step of determining the effective area of the source cell (304, 404, 508) using the first cell data comprises:
   obtaining area information indicative of the effective area of the source cell; and
   processing the area information with respect to the first cell data for determining the effective area of the source cell.

8. A computer-implemented method according to any of the preceding claims, further comprising:
   rendering a graphical user interface on a display of a user device; and
   providing, on the graphical user interface, a visual indication of each cross-connected cell in the communication network.

9. A computer-implemented method according to any of the preceding claims, further comprising:
   obtaining second cell data of the at least one filtered cell (402, 502);
   determining, using the second cell data, the direction of the at least one filtered cell (402, 502) and/or the effective area (504) of the at least one filtered cell;
   determining whether the effective area (504) of the at least one filtered cell (402, 502) overlaps with the effective area (302, 506) of the source cell (304, 404, 508).

10. A system (700) for automatically detecting cross-connected cells in a communication network according to a computer-implemented method of any of the claims 1-9, the system comprising a data repository (702) configured to store at least first cell data of a source cell (304, 404, 508) within the communication network, and a controller (704) communicably coupled to the data repository, wherein the controller is configured to execute steps of the computer-implemented method.

11. A system (700) according to claim 10, wherein the controller (704) is communicably coupled to a user device, the controller being configured to:
   render a graphical user interface on a display of the user device; and
   provide, on the graphical user interface, a visual indication of each cross-connected cell in the communication network.

12. A computer program product for automatically detecting cross-connected cells in a communication network, the computer program product comprising a non-transitory machine-readable data storage medium having stored thereon program instructions that, when accessed by a processing device, cause the processing device to execute steps of a computer-implemented method of any of the claims 1-9.

* * * * *